No. 889,865. PATENTED JUNE 2, 1908.
W. W. WALLACE.
DUMPING CAR.
APPLICATION FILED OCT. 8, 1907.
3 SHEETS—SHEET 1.
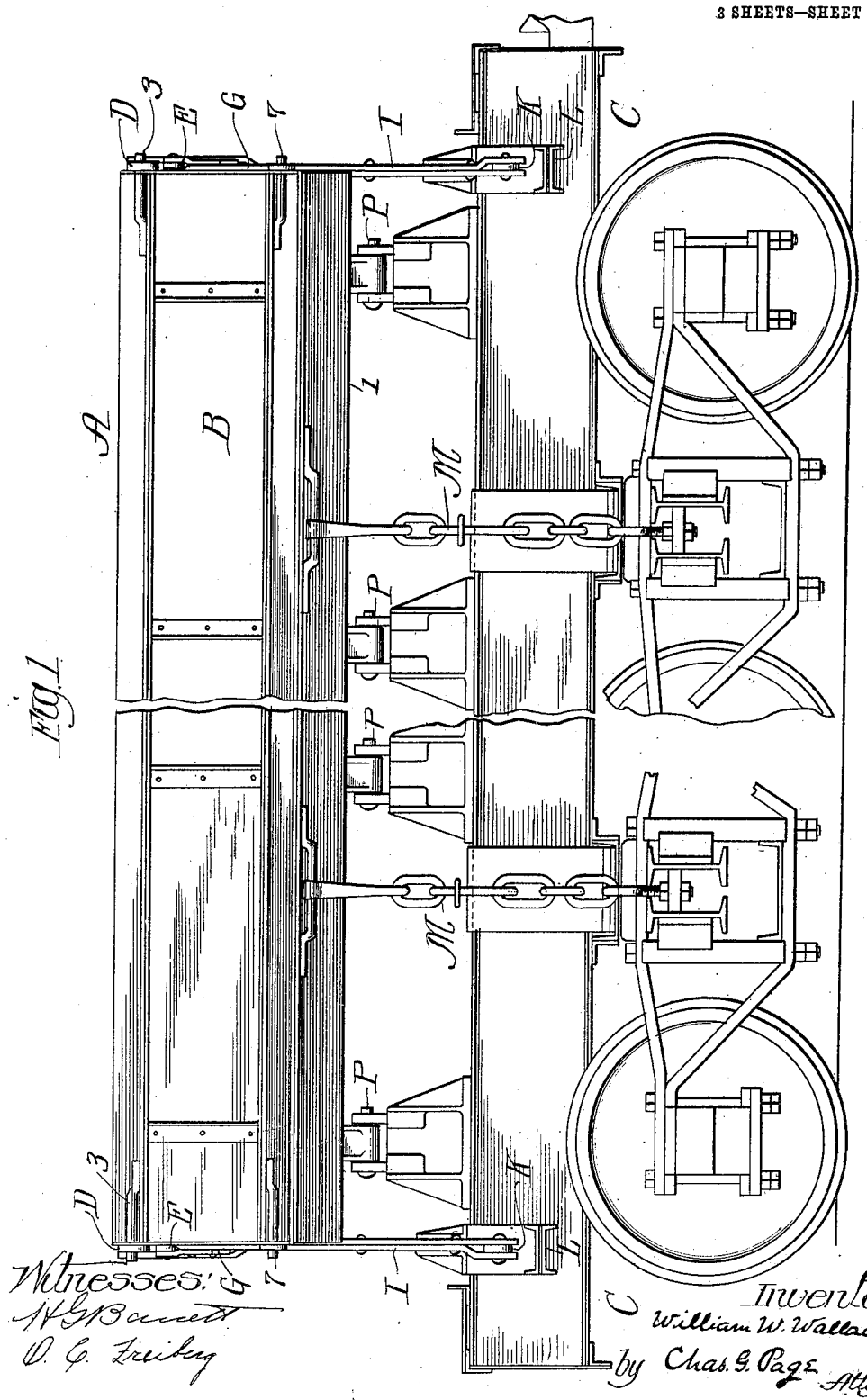

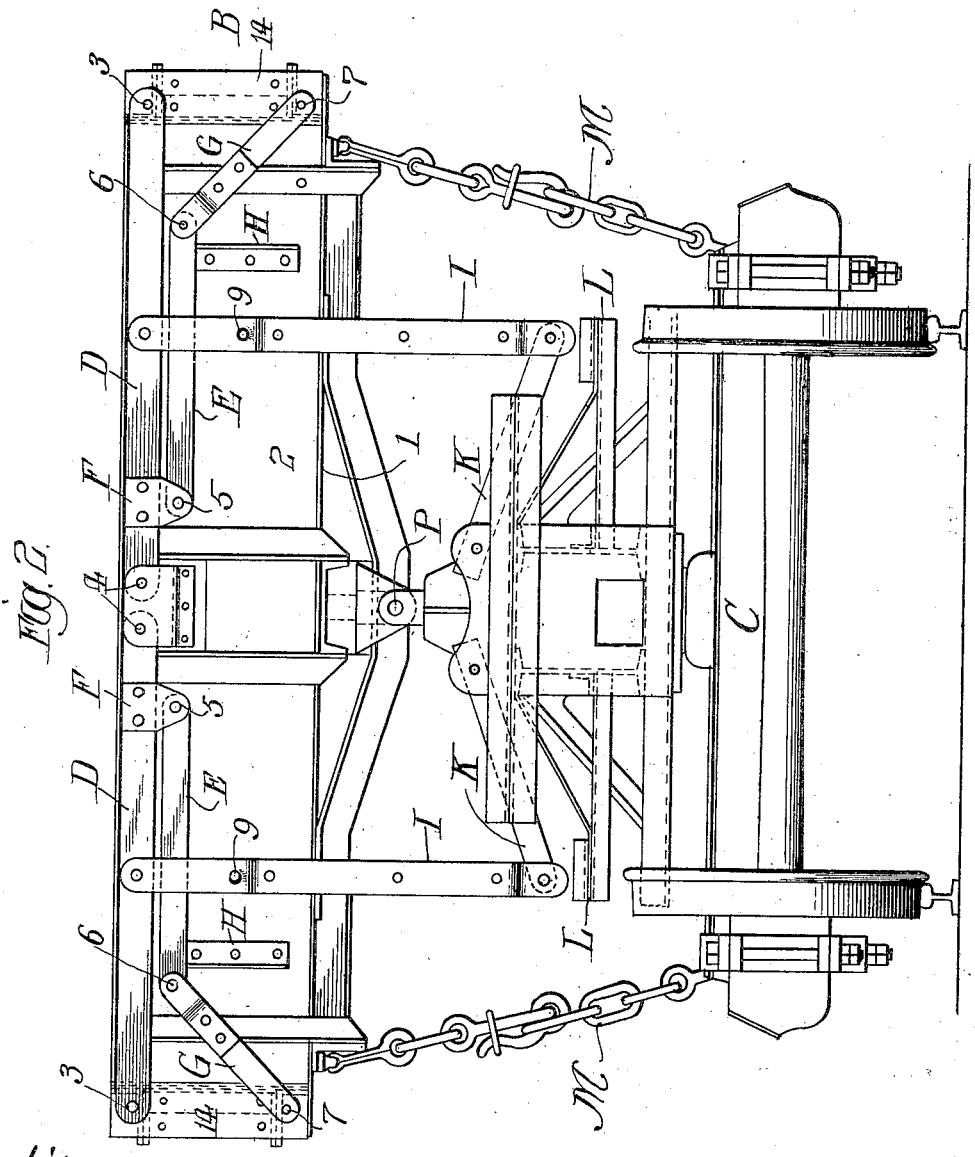

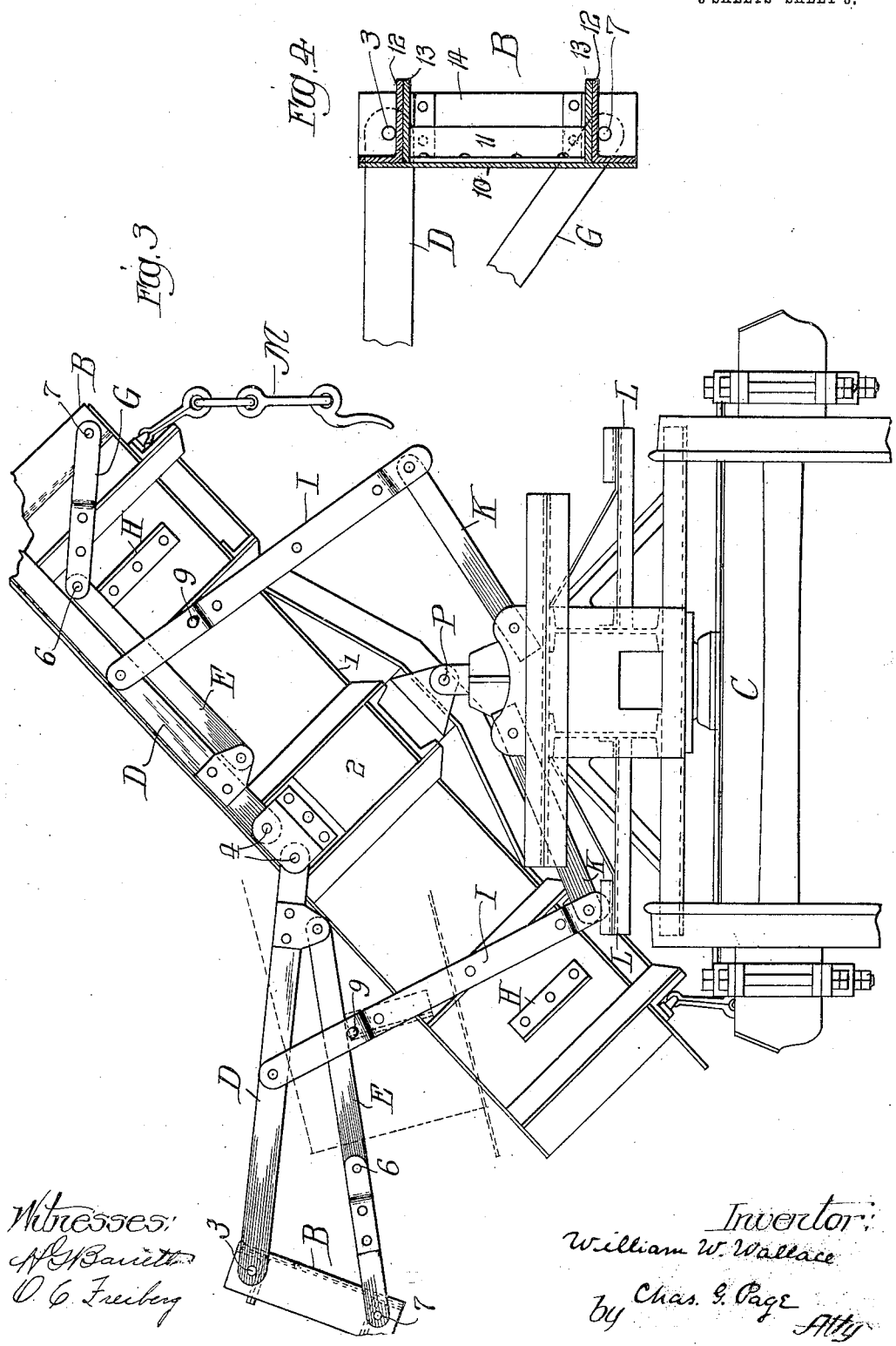

UNITED STATES PATENT OFFICE.

WILLIAM W. WALLACE, OF KNOXVILLE, TENNESSEE.

DUMPING-CAR.

No. 889,865.  Specification of Letters Patent.  Patented June 2, 1908.

Application filed October 8, 1907. Serial No. 396,445.

*To all whom it may concern:*

Be it known that I, WILLIAM W. WALLACE, a citizen of the United States, residing at Knoxville, in the county of Knox and State of Tennessee, have invented a new and useful Improvement in Dumping-Cars, of which the following is a specification.

My invention relates to dumping cars of the class in which the car body is in the nature of a box or receptacle supported to tilt upon a truck and having one or both of its sides movably supported, whereby the load carrying box or receptacle can be opened at either side in accordance with the direction in which it is tilted for the purpose of dumping the load, the car being also provided with door controlling mechanisms or devices, for opening and closing the doors or gates in alternation, and my invention is also particularly designed as an improvement upon the dumping cars illustrated in Letters Patent of the United States No. 781,577, granted to me January 31, 1905; No. 834,090, granted to me October 23, 1906, and No. 834,091, granted to me October 23, 1906.

Objects of my invention are, to provide improved means for automatically locking and unlocking the car doors, and to avoid all necessity for the use of upper hook-shaped door closing and holding arms, such as found in the last two of the above mentioned patents; to provide an exceedingly strong and reliable device for holding in closed position the lower portion of the door, and to provide certain novel and improved details as hereinafter more particularly set forth.

In the accompanying drawings: Figure 1 is a side elevation of a dumping car embodying my invention, the middle portion of the car being transversely broken away for convenience of illustration. Fig. 2 is understood to illustrate either end of the car in end elevation, the tilting body being in its normal horizontal position. Fig. 3 is a like view but showing the car in dumped position. Fig. 4 is a detail view showing a section taken transversely through one of the car doors.

The car body A is constructed with a bottom 1, end walls 2, and sides B forming movable gates or doors, and is supported for rocking or tilting action upon a truck C of any suitable known or desired construction adapted for service as a dumping car truck, whereon a box body has either or both of its opposite sides arranged as a door or doors.

When the car body is tilted laterally for the purpose of dumping its contained load, the door at the dumping side of the car opens to permit the materials to pass out, and when the car body is actuated to again bring it into a righted position the door referred to closes and is locked as a result of such action. The dumping car when thus constructed with oppositely arranged side doors B, is provided with four door controlling devices or mechanisms, arranged in pairs respectively at opposite ends of the car body, the two door controlling mechanisms at one end of the car being respectively connected with one and the other door end portions at such end of the car, and a like arrangement is observed as to the two door controlling mechanisms which are at the opposite end of the car body and which are respectively connected with one and the other of the two door ends at the end of the car last mentioned. It is therefore preferable that all of these door controlling mechanisms should be of like construction, and particularly as such arrangement permits the ready replacement of new for broken or injured parts in case of accident. Where these door controlling mechanisms are of like construction and operation, a description of one practically answers for the description of all four, and a description of the two door controlling mechanisms at one end of the car will also serve as a description of the two door controlling mechanisms at the opposite end of the car.

The door controlling mechanism shown at the left in Figs. 2 and 3, comprises a door supporting bar or arm D, which is pivoted at its outer end to the upper end portion of the door B as at 3, and pivoted at its inner end to the car body end 2 at a point adjacent to the upper edge of said car body end as at 4, and when the car body is in its normal horizontal position, the arm D will be horizontal or substantially so as illustrated. Below the door arm D is a bar or link E pivotally connected at its inner end with the upper door arm D, and in order to attain this pivotal connection, a lug or bracket F is formed with or attached to the inner end portion of the door arm D and to depend therefrom so as to provide a suitable bearing for a pivot 5, by which the inner end of the bar E is pivotally attached to the bracket or lug F, at a point below the upper door arm. The outer end of this bar E is jointed as by a pivot 6 to the inner end of a somewhat shorter bar or link G, which latter has its outer end pivoted to the lower end portion of the door B, as at 7. A bracket or stop device H is secured to the car body in position to maintain the bar E in the raised position shown in Fig. 2 when the car body is horizontal or substantially so, and under such conditions, the stop H maintains the bar E parallel or substantially parallel with the door arm D, and as a convenient construction, the stop H is simply an angle plate bolted to the outside of the car body end and having its flanged portion 8 standing out so as to engage the lower edge of the bar E.

The door controlling mechanism shown at the right in Fig. 2, corresponds with the door controlling mechanism above described, and it is therefore correspondingly lettered and numbered, it being also observed that the inner ends of the two door arms D, D, are relatively spaced and attached to the end 2 of the car by separate pivots 4, 4. In order to uphold the upper door arm and door at the dumping side of the car during the operation of dumping, the vibratory support I is pivotally attached to the upper door arm D shown at the left, and a like vibratory support I is pivotally attached to the upper door arm D shown at the right in each of said Figs. 2 and 3. As a simple arrangement, the lower ends of these vibratory props or supports I, are shown connected with the truck by vibratory arms or links K, and when the car body is in normal position as in Fig. 2, there will be a suitable extent of clearance between the lower ends of the prop bars I and bearings L conveniently formed by side sills of the truck frame.

When the car body is horizontal and the bars E are maintained in the raised position shown in Fig. 2 by means of the brackets or stops H, the links G which extend from the outer ends of the bars E will incline downwardly and outwardly, and as long as the bars E are thus upheld by the cams or stops H, the lower portions of the doors will be held in a tightly closed condition, it being also observed that at such time the upper portions of the doors will be firmly held against any laterally outward movement by means of the upper bars or door arms D, and that doors will be thus held closed as long as the normal or horizontal position of the car body is maintained. It is also understood that the car body is effectively maintained in such normal or horizontal position by means of chains M which are applied substantially as in other prior dumping cars, for example, as in my patents hereinbefore referred to.

If now the car is to be dumped to one side or the other, for example, to the left as in Fig. 3, the chains at the right of the car are suitably disconnected, and the car body is tilted to the left about a horizontal longitudinal axis extending through one or more pivots P by which the car body is hinged upon the truck. As the car body thus tilts to the left, the door controlling mechanism at the left descends with the downwardly tilting side portion of the car body until the prop I impinges upon and is arrested in its descending movement by the sill or stop L, and thereupon while the depression of said side portion of the car body continues, the upper door arm D at the left will be upheld by the prop I, which latter, however, during the concluding tilting action of the car body swings outwardly to a limited extent while bearing upon the sill L, so as to somewhat lower the upper door arm D and thereby somewhat lower the door at the left, as illustrated by a comparison of Fig. 2 with Fig. 3. During this tilting action of the car body the cam or stop H will be carried downwardly by the downward tilting portion of the car body to which it is secured, and as it is thus carried down, the bars E and G which are pivoted to form a sectional locking lever, will swing downwardly in direction to cause the sectional lever to straighten out. When this sectional locking lever E, G, is straightened out or in condition to bring its two sections in alinement, the section E will impinge against and bear upon a pin or stop 9 with which the prop bar I is provided, and at such juncture, the door at the left will be held by the straightened out lever in a downwardly and outwardly inclined position, as best illustrated in Fig. 3.

During the foregoing described dumping action at the left side of the dumping car, the door B at the right hand side of the car shown will remain closed, as the stop H at the right will hold the section E over it in position adjacent to and parallel with the door arm D above the same, and the jointed prop device shown at the right will move into the position shown in Fig. 2.

When the car body is tilted from the position shown in Fig. 3 back to the position shown in Fig. 2, the prop device at the left will move into its normal position, and as the stop H at the left rises with the upward movement of the portion of the car shown at the left, said stop will at a suitable moment engage under the section E of the locking device so as to break joint and raise the lever section E into normal position, and as section E thus rises, it will draw inwardly the outer section G and thereby draw inwardly the lower portion of the door until the latter is locked or firmly closed, as in the first position illustrated in Fig. 2.

When the car dumps to the right, the door controlling mechanism at said side of the car will have the same action hereinbefore described in connection with the door controlling mechanism at the left, and therefore, further description of such action is regarded as needless. It will also be clearly understood without further description that when the car is tilted either way, the door controlling mechanism at the dumping side will simultaneously and correspondingly operate in a manner to prop up the door at such side and that the door at the opposite side will remain closed.

In my said patents the upper door supporting arms have their outer ends connected with the doors by pivots having their axis outside of the planes of the doors, whereby there is a tendency on the part of either door when unlocked to swing outwardly to a limited extent. This feature is maintained to any desired extent in the present case.

As shown in Fig. 4, 10 indicates a long heavy metal plate which forms the main portion of the door. This plate 10 is strengthened by braces 11 and end plates 14, and also by longitudinal plates 13 and by end angle irons 12, which provide bearings for the pivots of the upper and lower members D and G. Each door is preferably constructed as thus described so as to render it extremely strong, and it will be observed that when the door is in a vertical position, its heaviest portion will be back of a vertical line intersecting the pivots 3 and 7. When the body tilts for the purpose of dumping, the door at the dumping side begins to relatively rise as soon as the prop bars I at such side strike the sills below them, that is to say—the tilting side of the car body in moving downwardly leaves the door while the latter is upheld by the prop bars, which latter swings somewhat outwardly. As the door thus relatively rises, its lower edge portion is swung outwardly by the load, and this outward swing of the lower portion of the door is assisted by the articulated lever E, G, which consists of metal bars and which tends to drop or move from the bent position shown in Fig. 2, toward the straightened position shown in Fig. 3, and when said articulated lever is in the position shown in Fig. 3, it will of course hold the door in or substantially the position therein shown. When the body is tipped back to right it, the cam or lifting device H will in due season engage under the articulated lever and bring the latter into the bent position shown in Fig. 2, thereby swinging inwardly and positively locking the door. It is also understood that the outward swing of the door during the tilting action of the car body is further assisted by the tendency of the door to thus swing outwardly by gravity, as hereinbefore explained.

What I claim as my invention is:

1. In a dumping car, the combination with a truck of a load carrying body supported for tilting action upon the truck and having a movable side door, of means for pivotally supporting the movable door; an articulated door closing device pivotally attached to the lower end portion of the door and also pivotally attached to the door upholding means, and a projection or stop device on the body arranged for engaging and bending the door closing device when the car body is righted, the said door closing device being arranged for holding the door closed when in bent position, and being maintained in such bent position by the stop device when the car body is in normal or horizontal position.

2. In a dumping car, a tilting body; a movable side door; a door arm pivotally attached at its outer end to the upper portion of the door and pivotally attached at its inner end to an end of the car body; an articulated door closing and locking device comprising a lever articulated between its ends and having its inner end pivotally attached to the door arm and having its outer end pivotally attached to the lower portion of the movable door, and a stop for engaging and maintaining said articulated lever in a bent condition when the car body is in normal position, and for releasing the articulated lever and permitting it to drop into a straightened condition when the car body is tilted, the lower portion of the door being normally held closed by the articulated lever when the latter is maintained in bent condition.

3. In a dumping car, a tilting car body; a movable side door therefor; an upper door arm having its opposite end portions respectively pivoted to the upper end portion of the door and to an end of the car body; a vibratory prop device pivoted to and depending from the upper door arm; a car truck upon which the vibratory prop is sustained during the dumping action; a door closing and locking device comprising an articulated lever having one section pivotally attached at its inner end to the upper door arm, and having the outer end of its other section pivotally attached to the lower end portion of the door; a stop device on the car end for engaging and causing the articulated lever to bend and draw inwardly the lower portion of the door, and for descending with the downwardly tilting car portion in dumping to permit the articulated lever to straighten out and thereby lengthen proportionally to the outward movement of the door; the said vibratory prop being provided with a stop for limiting downward bending of the articulated lever after the latter has arrived at a straightened out condition.

4. In a dumping car, a tilting body having a movable side gate or door for opening and closing the load receptacle provided by the car body; means for pivotally supporting the movable door; a door closing device consisting of an articulated lever jointed between its ends and having its inner end pivotally connected with the car body and having its outer end pivotally connected with the movable door, and means for holding the articulated lever in a bent condition when the car body is in loading position, and for releasing and allowing the articulated lever to straighten out when the car body is tilted from normal to dumping position.

5. In a dumping car, a tilting body having movable side doors pivotally supported on upper door arms having their inner ends pivoted to upper end portions of the body; swinging props pivoted to and depending from the door arms; and locking levers each comprising an inner section pivoted to one of the door arms, and an outer section pivoted to a lower end portion of one of the side doors.

6. In a dumping car, a tilting body having movable side doors pivotally supported on upper door arms having their inner ends pivoted to upper end portions of the body; swinging props I pivoted to and depending from the door arms; and locking levers each comprising an inner section E pivoted to one of the door arms, and an outer section G pivoted to a lower end portion of one of the side doors.

WILLIAM W. WALLACE.

Witnesses:
   F. D. OWINGS,
   J. L. MALCOLM.